(12) United States Patent
De Beer et al.

(10) Patent No.: US 7,710,448 B2
(45) Date of Patent: May 4, 2010

(54) SYSTEM AND METHOD FOR PREVENTING MOVEMENT IN A TELEPRESENCE SYSTEM

(75) Inventors: Marthinus F. De Beer, Los Gatos, CA (US); Philip R. Graham, Milpitas, CA (US); Randy K. Harrell, Los Gatos, CA (US); Ashok T. Desai, Fremont, CA (US); Philip E. Marechal, Mountain View, CA (US); Andrew D. Grunes, Santa Cruz, CA (US); Tark Abed, Palo Alto, CA (US); Martin Leugers, San Francisco, CA (US); Joshua T. Druker, San Francisco, CA (US); Feng Hao Yu, Mountain View, CA (US); Peter H. J. How, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 482 days.

(21) Appl. No.: 11/483,795

(22) Filed: Jul. 10, 2006

(65) Prior Publication Data

US 2007/0263081 A1 Nov. 15, 2007

Related U.S. Application Data

(60) Provisional application No. 60/794,016, filed on Apr. 20, 2006.

(51) Int. Cl.
*H04N 7/14* (2006.01)
*A47B 57/00* (2006.01)

(52) U.S. Cl. ............... 348/14.01; 348/14.08; 348/14.11

(58) Field of Classification Search ... 348/14.01–14.16; 379/202.01, 454; 370/260–261; 709/204, 709/205; 312/249.8, 249, 258; 108/64
See application file for complete search history.

(56) References Cited

U.S. PATENT DOCUMENTS

| 3,601,530 | A | * | 8/1971 | Edson et al. ................ 348/14.1 |
| 4,400,724 | A | * | 8/1983 | Fields ........................ 348/14.1 |
| 4,645,878 | A | * | 2/1987 | Hilger et al. ........... 379/202.01 |
| 4,758,887 | A | * | 7/1988 | Engel et al. ................ 348/14.1 |
| 5,850,250 | A | * | 12/1998 | Konopka et al. .......... 348/14.07 |
| 6,227,614 | B1 | * | 5/2001 | Rubin ........................ 297/172 |
| 6,324,331 | B1 | * | 11/2001 | DeMeritt et al. ............ 385/134 |
| 6,774,927 | B1 | | 8/2004 | Cohen et al. ................ 348/14.1 |
| 6,795,108 | B2 | | 9/2004 | Jarboe et al. ............. 348/14.09 |
| 6,989,856 | B2 | | 1/2006 | Firestone et al. .......... 348/14.09 |
| 7,043,528 | B2 | | 5/2006 | Schmitt et al. .............. 709/204 |
| 7,050,084 | B1 | | 5/2006 | Lang ........................ 348/14.16 |
| 7,057,636 | B1 | | 6/2006 | Cohen-Solal et al. ..... 348/14.08 |
| 2005/0268823 | A1 | * | 12/2005 | Bakker et al. ............ 108/50.02 |
| 2005/0274297 | A1 | * | 12/2005 | Montague et al. ............. 108/64 |
| 2007/0070177 | A1 | * | 3/2007 | Christensen ............. 348/14.01 |

* cited by examiner

*Primary Examiner*—Melur Ramakrishnaiah
(74) *Attorney, Agent, or Firm*—Baker & Botts L.L.P.

(57) ABSTRACT

A method for preventing movement in a telepresence system, includes a plurality of cameras. Each camera has a respective field of vision for viewing one or more users. The fields of vision each have lateral boundaries. The system also includes a plurality of restrictive elements. Each restrictive element is positioned along a respective lateral boundary of a field of vision of the fields of vision of the plurality of cameras such that viewed users each positioned within a field of vision of the plurality of cameras are restricted by the plurality of restrictive elements from moving outside of the field of vision in which each viewed user is positioned.

30 Claims, 7 Drawing Sheets

SYSTEM AND METHOD FOR PREVENTING MOVEMENT IN A TELEPRESENCE SYSTEM

RELATED APPLICATIONS

This application claims priority to U.S. Patent Application Ser. No. 60/794,016, entitled "VIDEOCONFERENCING SYSTEM," which was filed on Apr. 20, 2006.

TECHNICAL FIELD OF THE INVENTION

This invention relates generally to communications and, more particularly, to a system and method for preventing movement in a telepresence system.

BACKGROUND

As the "global economy" continues to expand, so does the need to be able to communicate over potentially long distances with other people. One area of communication that has seen steady growth and increased customer confidence is the use of the Internet and other networking topologies. With the constant growth and development of networking capabilities has come the ability to implement more and better products and features. One area in particular that has seen growth and development in both quantity and quality is the area of Internet enabled phone calls, using for example VoIP. By taking audio signals (the speaker's voice) and converting them into Internet protocol (IP) packets, IP phones are able to send the audio signals over IP networks, such as the Internet.

There are times when voice communication alone is not sufficient. In such instances video conferencing may be an attractive and viable alternative. Current video conferencing often involves complicated setup and call establishment procedures (usually requiring someone from technical support to setup the equipment prior to the conference). Furthermore, where there are multiple users the typical video conferencing system divides a single screen into different sections. Each section is usually associated with a particular location, and all the users at that location need to try to fit within the camera's field of vision. Current video conferencing systems also typically use a single loudspeaker, or loudspeaker pair, for reproducing the sound. Thus, regardless of who is speaking the sound comes from the same location. This often requires the receiving user to carefully scan the screen, examining each user individually, to determine who is speaking. This can be especially difficult in a video conference in which the screen is divided among several locations, and each location has multiple users within the camera's field of vision.

SUMMARY

In accordance with the particular embodiments, a system and method for preventing movement in a telepresence system is provided which substantially eliminates or reduces the disadvantages and problems associated with previous systems and methods.

In accordance with a particular embodiment of the present invention, a system for preventing movement in a telepresence system includes a plurality of cameras. Each camera has a respective field of vision for viewing one or more users. The fields of vision each have lateral boundaries. The system also includes a plurality of restrictive elements. Each restrictive element is positioned along a respective lateral boundary of a field of vision of the fields of vision of the plurality of cameras such that viewed users each positioned within a field of vision of the plurality of cameras are restricted by the plurality of restrictive elements from moving outside of the field of vision in which each viewed user is positioned.

In particular embodiments the system may also include a table at which the viewed users sit. In such an embodiment the plurality of restrictive elements may include a plurality of partitions coupled to the table. Depending on the embodiment the partition may be: coupled to an underneath portion of the table, covered in a soft foam material, include a power outlet, or include a network outlet.

In particular embodiments the system may include a plurality of restrictive elements that include a plurality of table elements. Each table element may be incorporated into a table and positioned along a respective lateral boundary of a field of vision of the fields of vision of the plurality of cameras and configured to inhibit use by the viewed users of the portion of the table into which the table element is incorporated. Depending on the embodiment the plurality of table elements may include: a plurality of gaps, a plurality of uneven or non-rigid surface areas, or a plurality of perforated surface areas.

In particular embodiments the plurality of restrictive elements may include a plurality of floor elements. Each floor element may be positioned and configured such that the viewed users are each inhibited from moving in a chair outside of the field of vision in which each viewed user is positioned. Depending on the embodiment the plurality of floor elements may include a plurality of ridges or a plurality of indentations.

In accordance with another embodiment, a method for preventing movement in a telepresence system includes positioning a plurality of cameras. Each camera has a respective field of vision for viewing one or more users. The fields of vision each have lateral boundaries. The method also includes positioning a plurality of restrictive elements. Each restrictive element is along a respective lateral boundary of a field of vision of the fields of vision of the plurality of cameras such that viewed users each positioned within a field of vision of the plurality of cameras are restricted by the plurality of restrictive elements from moving outside of the field of vision in which each viewed user is positioned.

Technical advantages of particular embodiments include preventing the movement of users along the edge of a table. Accordingly, users of a telepresence system may remain within the field of vision of the respective camera. Another technical advantage of particular embodiments is the inclusion of various utility outlets (e.g., power and network) within the partitions. Accordingly, the utility outlets may draw the remote users to that area and remote users are not distracted by the sight of local utility outlets located on the tope of the local table. Another technical advantage of particular embodiments is the use of a soft foam material on the partitions. Accordingly, users are less likely to hurt their legs or knees on the table support structures.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

To provide a more complete understanding of particular embodiments of the present invention and the features and advantages thereof, reference is made to the following description, taken in conjunction with the accompanying drawings, in which.

DESCRIPTION OF EXAMPLE EMBODIMENTS

Figure 1:
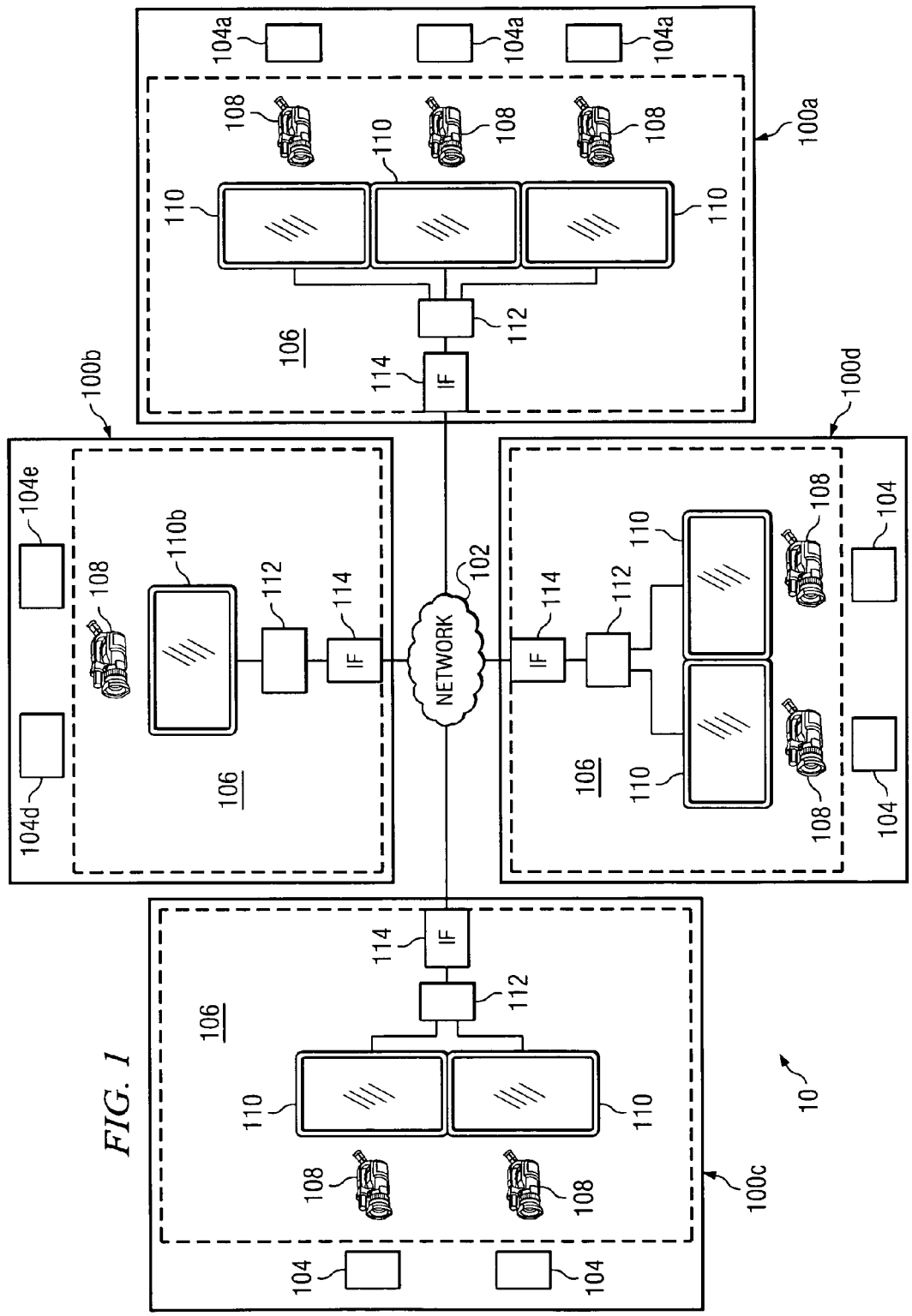
FIG. 1 illustrates a block diagram illustrating a system for conducting a visual conference between locations using at least one telepresence system, in accordance with a particular embodiment of the present invention.

FIG. 1 is a block diagram illustrating a system 10 for conducting a visual conference between locations using at least one telepresence system. The illustrated embodiment includes a network 102 that facilitates a visual conference between remotely located sites 100 using telepresence equipment 106. Sites 100 include any suitable number of users 104 that participate in the visual conference. System 10 provides users 104 with a realistic videoconferencing experience even though a local site 100 may have less telepresence equipment 106 than a remote site 100.

Network 102 represents communication equipment, including hardware and any appropriate controlling logic, for interconnecting elements coupled to network 102 and facilitating communication between sites 100. Network 102 may include a local area network (LAN), a metropolitan area network (MAN), a wide area network (WAN), any other public or private network, a local, regional, or global communication network, an enterprise intranet, other suitable wireline or wireless communication link, or any combination of the preceding. Network 102 may include any combination of gateways, routers, hubs, switches, access points, base stations, and any other hardware, software, or a combination of the preceding that may implement any suitable protocol or communication.

User 104 represents one or more individuals or groups of individuals who are present for the visual conference. Users 104 participate in the visual conference using any suitable device and/or component, such as an audio Internet Protocol (IP) phones, video phone appliances, personal computer (PC) based video phones, and streaming clients. During the visual conference, users 104 engage in the session as speakers or participate as non-speakers.

Telepresence equipment 106 facilitates the videoconferencing among users 104. Telepresence equipment 106 may include any suitable elements to establish and facilitate the visual conference. For example, telepresence equipment 106 may include loudspeakers, microphones, or a speakerphone. In the illustrated embodiment, telepresence equipment 106 includes cameras 108, monitors 110, a processor 112, and a network interface 114.

Cameras 108 include any suitable hardware and/or software to facilitate both capturing an image of user 104 and her surrounding area as well as providing the image to other users 104. Cameras 108 capture and transmit the image of user 104 as a video signal (e.g., a high definition video signal). Monitors 110 include any suitable hardware and/or software to facilitate receiving the video signal and displaying the image of user 104 to other users 104. For example, monitors 110 may include a notebook PC, a wall mounted display, a floor mounted display, or a free standing display. Monitors 110 display the image of user 104 using any suitable technology that provides a realistic image, such as high definition, compression hardware, and efficient encoding/decoding standards. Telepresence equipment 106 establishes the visual conference session using any suitable technology and/or protocol, such as Session Initiation Protocol (SIP) or H.323. Additionally, telepresence equipment 106 may support and be interoperable with other video systems supporting other standards, such as H.261, H.263, and/or H.264.

Processor 112 controls the operation and administration of telepresence equipment 106 by processing information and signals received from cameras 108 and interfaces 114. Processor 112 includes any suitable hardware, software, or both that operate to control and process signals. For example, processor 112 may be a programmable logic device, a microcontroller, a microprocessor, any suitable processing device, or any combination of the preceding. Interface 114 communicates information and signals to and receives information and signals from network 102. Interface 114 represents any port or connection, real or virtual, including any suitable hardware and/or software that allow telepresence equipment 106 to exchange information and signals with network 102, other telepresence equipment 106, or and/or other elements of system 10.

In an example embodiment of operation, users 104 at sites 100a and 100b desire to participate in a visual conference. Users 104 may enter a room from which they will participate in the visual conference. As they enter the room they may approach a table associated with the telepresence system. The table may include any of a wide variety of different types of dividers, such as partitions, table elements or floor elements. The dividers may initially help to guide users to their respective locations along the table of the telepresence system. Once the visual conference begins the dividers may keep users 104 within the field of vision of the respective camera 108. This may help to ensure that their image, as displayed on monitors 110, is not obscured or hidden.

Modifications, additions, or omissions may be made to system 10. For example, system 10 may include any suitable number of sites 100 and may facilitate a visual conference between any suitable number of sites 100. As another example, sites 100 may include any suitable number of cameras 108 and monitors 110 to facilitate a visual conference. As yet another example, the visual conference between sites 100 may be point-to-point conferences or multipoint conferences. Moreover, the operations of system 10 may be performed by more, fewer, or other components. Additionally, operations of system 10 may be performed using any suitable logic.

Figure 2:
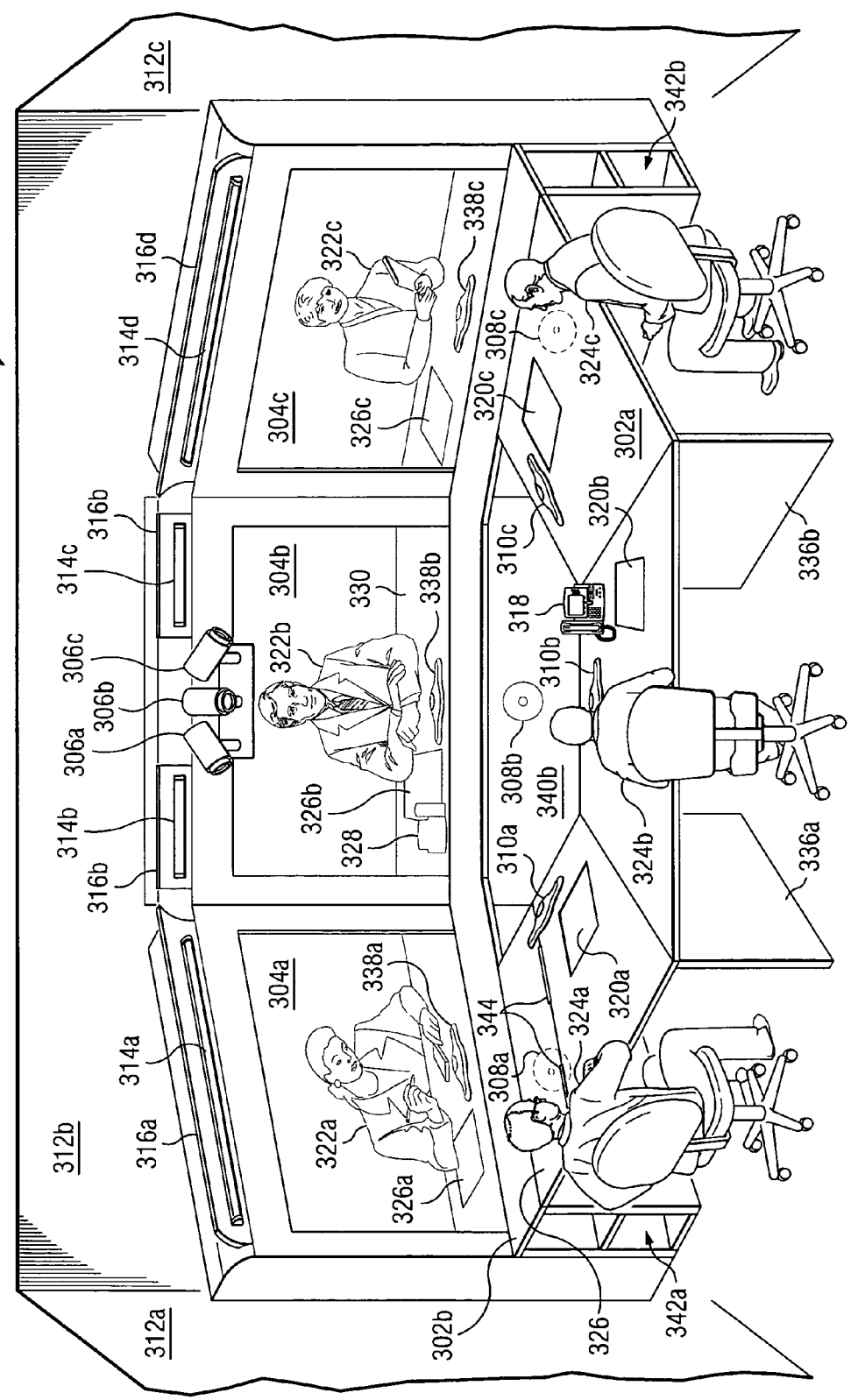
FIG. 2 illustrates a perspective view of a local exemplary telepresence system including portions of a remote telepresence system as viewed through local displays, in accordance with a particular embodiment of the present invention.

FIG. 2 illustrates a perspective view of a local exemplary telepresence system including portions of a remote telepresence system as viewed through local displays. Telepresence system 300 may be similar to any one of sites 100 of FIG. 1. Telepresence system 300 provides for a high-quality visual conferencing experience that surpasses typical video conference systems. Through telepresence system 300 users may experience lifelike, fully proportional (or nearly fully proportional) images in a high definition (HD) virtual table environment. The HD virtual table environment, created by telepresence system 300, may help to develop an in-person feel to a visual conference. The in-person feel may be developed not only by near life-sized proportional images, but also by the exceptional eye contact, gaze perspective (hereinafter, "eye gaze"), and location specific sound. The eye gaze may be achieved through the positioning and aligning of the users, the cameras and the monitors. The location specific sound may be realized through the use of individual microphones located in particular areas that are each associated with one or more loudspeakers located in proximity to the monitor displaying the area in which the microphone is located. This may allow discrete voice reproduction for each user or group of users.

Telepresence system 300 may also include a processor to control the operation and administration of the components of the system by processing information and signals received from such components. The processor may include any suitable hardware, software, or both that operate to control and process signals. For example, the processor may be a programmable logic device, a microcontroller, a microprocessor, any suitable processing device, or any combination of the preceding. Through its operation, the processor may facilitate the accurate production of the eye-gaze functionality as well as the location specific sound features discussed herein.

The design of telepresence system 300 is not limited to only improving those components used in typical video conferencing systems, such as monitors 304, cameras 306, loudspeakers 308, and microphones 310, rather it may encompass many other aspects, features, components and/or devices within the room, including such components as table 302, walls 312, lighting (e.g., 314 and 316) and several other components discussed in more detail below. These components may be designed to help mask the technology involved in telepresence system 300, thus decreasing the sense of being involved in a video conference while increasing the sense of communicating in person. Telepresence system 300, as depicted in FIG. 2, may also include several users both local, users 324a-324c, and remote, users 322a-322c.

The eye gaze and the location specific sound features may combine to produce a very natural dialogue between local and remote users. When, for example, remote user 322a speaks, his voice is reproduced through loudspeaker 308a located proximate to monitor 304a, the monitor on which remote user 322a is displayed. Local users 324 may naturally turn their attention towards the sound and thus may be able to quickly focus their attention on remote user 322a. Furthermore, if remote user 322a is looking at something or someone, the exceptional eye gaze capabilities of telepresence system 300 may allow local users 324 to easily identify where he is looking. For example, if remote user 322a asks "what do you think" while looking at local user 324c, the eye gaze ability of telepresence system 300 may allow all the users, both local and remote, to quickly identify who "you" is because it may be clear that remote user 322a is looking at local user 324c. This natural flow may help to place the users at ease and may contribute to the in-person feel of a telepresence assisted visual conferencing experience.

Several of the figures discussed herein depict not only components of the local telepresence system, but also those components of a remote telepresence system that are within the field of vision of a remote camera and displayed on a local monitor. For simplicity, components located at the remote site will be preceded by the word remote. For example, the telepresence system at the other end of the visual conference may be referred to as the remote telepresence system. When a component of the remote telepresence system can be seen in one of monitors 304 it may have its own reference number, but where a component is not visible it may use the reference number of the local counterpart preceded by the word remote. For example, the remote counterpart for microphone 310a may be referred to as remote microphone 338a, while the remote counterpart for loudspeaker 308b may be referred to as remote loudspeaker 308b. This may not be done where the location of the component being referred to is clear.

Part of the in-person experience may be achieved by the fact that the telepresence system may include many of the features and/or components of a room. In some embodiments the rooms at both ends of the conference may be similar, if not identical, in appearance because of the use of telepresence system 300. Thus, when local users 324 look into monitors 304 they are presented with an image having, in the background, a room that appears to match their own room. For example, walls 312 of telepresence system 300 may have similar colors, patterns, and/or structural accents or features as remote walls 312 of the remote telepresence system.

Another aspect of telepresence system 300 that lends itself to creating an in-person experience is the configuration of table 302, remote table 330, monitors 304 and remote cameras 306. These components are positioned in concert with one another such that it appears that table 302 continues through monitor 304 and into table 330, forming a single continuous table, instead of two separate tables at two separate locations. More specifically, table 302 may include a full sized table front section 302a that may be slightly curved and/or angled. Table front section 302a may be coupled to table rear section 302b which may continue from table front section 302a. However, table rear section 302b may have a shortened width. The shortened width of table rear section 302b may be such that when it is juxtaposed with the portion of remote table 330 displayed in monitors 304, the two separate portions appear to be a single portion of the table having a full width similar to table front section 302a.

Besides the placement of remote table 330, the placement and alignment of remote cameras 306 may be such that the correct portion of table 330 is within remote cameras 306 field of vision as well as the user or group of users that may be sitting at that portion of table 330. More specifically, remote camera 306a may be aligned to capture the outer left portion of table 330 and remote user 322a, remote camera 306b may be aligned to capture the outer center portion of table 330 and remote user 322b and remote camera 306c may be aligned to capture the outer right portion of table 330 and user remote 322c. Each camera 306 and remote camera 306 may be capable of capturing video in high-definition, for example cameras 306 may capture video at 720i, 720p, 1080i, 1080p or other higher resolutions. It should be noted that where multiple users are within a camera's field of vision the alignment of the camera does not need to be changed.

Figure 3:
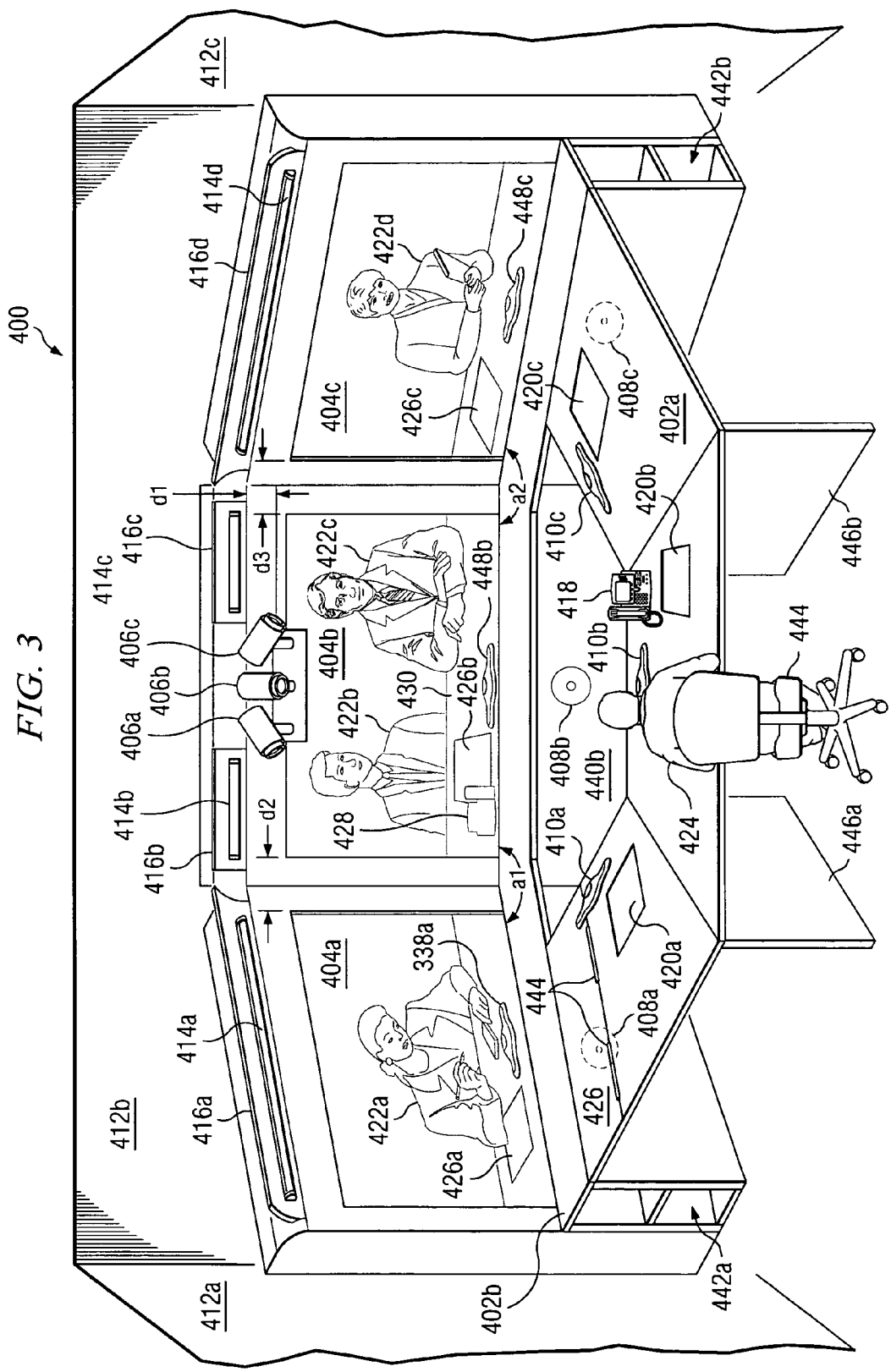
FIG. 3 illustrates another perspective view of a local exemplary telepresence system including portions of a remote telepresence system as viewed through local displays, in accordance with a particular embodiment of the present invention.

In some embodiments remote cameras 306 may be aligned so that any horizontal gap between the adjacent vertical edges of the field of vision between two adjacent cameras corresponds to any gap between the screens of monitors 304 (the gap, e.g., gaps d2 and d3 of FIG. 3, between monitors may include any border around the screen of the monitor as well as any space between the two monitors). For example, the horizontal gap between the adjacent vertical edges of remote camera 306a and 306b, may align with the gap between the screens of monitors 304a and 304b. Furthermore, remote cameras 306 and monitors 304 may be aligned so that objects that span the field of vision of multiple cameras do not appear disjointed (e.g., the line where the remote wall meets the remote ceiling may appear straight, as opposed to being at one angle in one monitor and a different angle in the adjacent monitor). Thus, if remote user 322a were to reach across to touch, for example, computer monitor 326b, users 324 may not see abnormal discontinuities (e.g., abnormally long, short or disjointed) in remote user 322's arm as it spans across monitors 304a and 304b (and the field of vision of remote cameras 306a and 306b).

In some embodiments monitors 304 may be capable of displaying the high-definition video captured by remote cameras 306. For example, monitors 304 may be capable of displaying video at 720i, 720p, 1080i, 1080p or any other high resolution. In some embodiments monitors 304 may be flat panel displays such as LCD monitors or plasma monitors. In particular embodiments monitors 304 may have 60 or 65 inch screens (measured diagonally across the screen). The large screen size may allow telepresence system 300 to display remote users 322 as proportional and life-sized (or near proportional and near life-sized) images. The high-definition display capabilities and large screen size of monitors 304 may further add to the in-person effect created by telepresence system 300 by increasing the size of the video image while also maintaining a clear picture (avoids pixelation or blurring that may result from attempting to display a standard definition image on a large monitor).

In some embodiments, monitors 304 may be positioned so that they form an angled wall around table rear section 302b. In particular embodiments, monitors 304 may be aligned such that their arrangement approximately mirrors the outside edge of table front section 302a. More specifically, monitor 304b may be parallel to wall 312b, while monitors 304a and 304c may be angled in towards user 324b and away from wall 312b. While monitors 304a and 304c are angled (compared to monitor 304b), the inside vertical edge of each monitor (the rightmost edge of monitor 304a and the leftmost edge of monitor 304c) may abut or nearly abut the left and right sides, respectively, of monitor 304b. Similarly, the bottom edge of monitors 304b may abut or nearly abut the back edge of table rear section 302b. In particular embodiments, monitors 304 may be positioned so that the bottom border or frame of monitor 304 is below the top surface of table rear section 302b and thus is not visible to users 324. This may provide for an apparent seamless transition from local table 302 to remote table 330 as displayed on monitors 304.

In some embodiments, monitors 304, remote monitors 304 and remote cameras 306 may further be positioned/aligned to increase the accuracy and efficacy of the eye gaze of remote users 322. Remote cameras 306 may be positioned a predetermined distance below the top edge of remote monitors 304. The predetermined distance may be based on such factors as the size of remote monitors 304 and/or the distance between remote users 322 and remote cameras 306. For example, in particular embodiments, remote cameras 306 may be located 4 to 6 inches below the top of remote monitor 304a. Furthermore, remote cameras 306 may be directed at remote table 330 such that the central axis of each camera may be approximately perpendicular to the outside edge (the edge where the remote users may sit) of remote table 330 (note that where the outside edge is curved the central axis of each camera may be approximately perpendicular to a line tangential to the outside edge of the remote table at a point approximately in the middle of the respective user section). Thus, when remote users 322 are involved in a telepresence session with local users 324 it may appear that remote users 322 are looking at local users 324. More specifically, the images of remote users 322 may appear on monitor 304 to be creating/establishing eye-contact with local users 324 even though remote users 322 are in a separate location. As may be apparent, increasing the accuracy of the eye gaze increases the in-person feel of a visual conference hosted via telepresence system 300.

Depending on the embodiment, cameras 306 may be freely movable, not readily moveable (e.g., they may require some tools to adjust them), or fixed. For example, in particular embodiments in which cameras 306 are not readily moveable, it may still be possible to fine tune the alignment of cameras 306 to the left or right, up or down, or rotationally. In some embodiments it may be desirable to not have to adjust cameras 306 each time telepresence system 300 is used because doing so may decrease the simplicity of using telepresence system 300. Thus, it may be advantageous to limit the area in which a user may sit when interfacing with telepresence system 300. One such component of telepresence system 300 that may be used to help control where users sit in relation to the cameras may be the table. Users 324 may sit along the outside edge of table front section 302a to be able to take notes, rest their elbows or otherwise use table 302. This may allow the depth of field and zoom of cameras 306 to be set based on the size of table 302. For example, in some embodiments the depth of field of cameras 306 may be set so that if users 324 are between two feet in front of and four feet behind the outside edge of table front section 302a, they may be in focus. Similarly, the zoom of cameras 306 may be set so that users sitting at the table will appear life-sized when displayed in remote monitors. As should be apparent, the amount of zoom may not only depend on distance between cameras 306 and users 324, but also the screen size of remote monitors 304.

Besides keeping users 324 within the focus range of cameras 306 it may also be desirable to keep them within the field of vision of cameras 306. In some embodiments, dividers 336 may be used to limit users 324's lateral movement along/ around the outside edge of table front section 302a. The area between dividers 336 may correspond to the field of vision of the respective cameras 306, and may be referred to as a user section. In some embodiments each user section may be wide enough to accommodate two users. Having dividers to restrict lateral movement along table 302 may be particularly important where there are multiple users within a camera's field of vision. This may be so because with multiple users within a particular camera's field of vision it may be more likely that the multiple users will need more lateral space along table 302 (as opposed to a single user). Therefore, the dividers may help to prevent the multiple users from inadvertently placing themselves, in whole or in part, outside of the field of vision.

Dividers 336 may be shaped and sized such that a user would find it uncomfortable to be right next to, straddling, behind or otherwise too close to dividers 336. For example, in particular embodiments dividers 336 may be large protrusions covered in a soft foam that may extend along the bottom surface of table front section 302 up to or beyond the outside edge of table front section 302a. In particular embodiments, dividers 336 may be used in supporting table 302 or they may be added to certain components of the support structure of table 302. Using dividers 336 as part of the support structure of table 302 may increase the amount of foot/leg room for users 324 under table 302. Different embodiments may use different dividers or other components or features to achieve the same purpose and may provide additional or alternate functionality as discussed in more detail below.

In some embodiments, table 302 may include other features that may help guide a user to a particular area (e.g., the center of cameras 306's field of vision) of table 302, or that may help prevent a user from straying out of a particular area and thus into the fields of vision of multiple cameras or out of the field of vision of a particular camera. For example, table 302 may include computer monitors 320, which may be used to display information from a computer (local or remote), such as a slide-show or a chart or graph. Computer monitors 320 may include CRT, LCD or any other type of monitor cable of displaying images from a computer. In some embodiments computer monitors 320 may be integrated into table 302 (e.g., the screen of computer monitors 320 may be viewed by looking down onto the table top of table 302) while in other embodiments they may be on the surface (e.g., the way a traditional computer monitor may rest on a desk). In particular embodiments, computer monitors 320 may not be a part of table 302, but rather they may be separate from table 302. For example, they may be on a movable cart. Furthermore, some embodiments may use a combination of integrated, desktop and separate monitors.

Another feature of table 302 that may be used to draw users 324 to a particular area may be microphone 310. In particular embodiments, microphones 310 may be integrated into table 302, thereby reducing a user's ability to move it. For example, microphone 310 may be centered within the field of vision of the respective camera 306. This may provide an additional cue to the users to draw them to the center of the field of vision. In some embodiments microphones 310 may be freely movable, thereby allowing it to be repositioned if more than one user is trying to use the same microphone. In some embodiments microphones 310 may be directional microphones having cardioid, hypercardioid, or other higher order directional patterns. In particular embodiments microphones 310 may be low profile microphones that may be mounted close to the surface of table 302 so as to reduce the effect of any reflection of sound off of table 302. In some embodiments microphones 310 may be linked such that when multiple microphones, for example microphones 310a and 310b, detect the same sound, the detected sound is removed via, for example, filtering from the microphone at which the detected sound is weakest. Thus, it may be that the sound from a particular user may primarily be associated with the microphone closest to the speaking user.

Some embodiments may take advantage of being able to have sound coming from a single source (e.g., microphone 310a) having a known location (e.g., the left side of table 302) by enabling location specific sound. Telepresence system 300 may reproduce the sound detected by a particular microphone with a known location through a loudspeaker, or pair of loudspeakers, in proximity to the monitor that is displaying the area around the particular microphone that detected the sound. Thus, sound originating on the left side of remote telepresence system 300 may be reproduced on the left side of telepresence system 300. This may further enhance the in-person effect by reproducing the words of a remote user at the loudspeaker near the monitor on which that remote user is displayed. More specifically, if remote user 322a speaks, it may be that both remote microphones 338a and 338b may detect the words spoken by user 322a. Because user 322a is closer to microphone 338a and because microphone 338a is oriented towards user 322a, it may be that the signal of user 322a's voice is stronger at microphone 338a. Thus, the remote telepresence system may ignore/filter the input from microphone 338b that matches the input from microphone 338a. Then, it may be that loudspeaker 308a, the loudspeaker under monitor 304a, reproduces the sound detected by microphone 338a. When user's 324 hear sound coming from loudspeaker 308a they may turn that way, much like they would if user 322a were in the same room and had just spoken.

In particular embodiments, loudspeakers 308 may be mounted below, above, behind, or on the sides of each of monitors 308, or they may otherwise be located in proximity to monitors 308 so that when, for example, loudspeaker 308b reproduces words spoken by remote user 322b, users 324 may be able to quickly identify that the sound came from remote user 322b displayed in monitor 304b. In addition to loudspeakers 308, some embodiments of telepresence system 300 may include one or more additional auxiliary loudspeakers. The auxiliary loudspeakers may be used to patch in a remote user who may not have access to a telepresence system or any type of video conferencing hardware. The auxiliary loudspeaker may be part of IP phone 318 or it may be in addition to any loudspeaker that may be a part of IP phone 318. While loudspeakers 308 (or portions thereof) are visible in FIG. 2, in some embodiments loudspeakers 308 may visibly be obscured by a sound-transparent screen or other component. The screen may be similar in material to the sound-transparent screen used on many consumer loudspeakers (e.g., a fabric or metal grill). To help reduce the indication that telepresence system 300 includes loudspeakers 308, the sound-transparent screen may cover the entire area under monitors 304. For example, loudspeaker area 340b (including loudspeaker 308b) may be covered in the sound-transparent material.

As may be ascertained from the preceding description, each remote user 322 may have associated with them a monitor, a remote camera, a remote microphone, and/or a loudspeaker. For example remote user 322c may have associated with him monitor 304c, remote camera 306c, remote microphone 338c, and/or loudspeaker 308c. More specifically, remote camera 306c may be trained on the user section in which user 322c is seated so that his image is displayed on monitor 304c and when he speaks microphone 338c may detect his words which are then played back via loudspeaker 308c while users 324 watch and listen to remote user 322c. Thus, from the perspective of local users 324 the telepresence system 300 assisted visual conference may be conducted as though remote user 322c was in the room with local users 324.

Another feature of some embodiments is the use of lighting that may be designed/calibrated in concert with remote cameras 306 and monitors 304 to enhance the image displayed by monitors 304 so that the colors of the image of remote users 322 displayed on monitors 304 more closely approximate the actual colors of remote users 322. The lighting may be such that its color/temperature helps to compensate for any discrepancies that may be inherent in the color captured by remote cameras 306 and/or reproduced by monitors 304. For example, in some embodiments the lighting may be controlled to be around 4100 to 5000 Kelvin.

Particular embodiments may not only control the color/temperature of the lights, but may also dictate the placement. For example, there may be lighting placed above the heads of remote users 322 to help reduce any shadows located thereon. This may be particularly important where remote cameras 306 are at a higher elevation than the tops of remote users 322's heads. There may also be lighting placed behind remote cameras 306 so that the front of users 322 is properly illuminated. In particular embodiments, lights 314 may be mounted behind, and lower than the top edge of, monitors 304. In some embodiments, reflectors 316 may be positioned behind monitors 304 and lights 314 and may extend out beyond the outside perimeter of monitors 304. In some embodiments the portion of reflectors 316 that extends beyond monitors 304 may have a curve or arch to it, or may otherwise be angled, so that the light is reflected off of reflectors 316 and towards users 324. In particular embodiments, filters may be used to filter the light being generated from behind cameras 306. Both the reflectors and filters may be such that remote users are washed in a sufficient amount of light (e.g., 300-500 luxes) while reducing the level of intrusiveness of the light (e.g., having bright spots of light that may cause remote user 324 to squint). Furthermore, some embodiments may include a low gloss surface on table 302. The low gloss surface may reduce the amount of glare and reflected light caused by table 302.

While telepresence system 300 may include several features designed to increase the in-person feel of a visual conference using two or more telepresence systems 300, telepresence system 300 may also include other features that do not directly contribute to the in-person feel of the conference but which nonetheless may contribute to the general functionality of telepresence system 300. For example, telepresence system 300 may include one or more cabinets 342. Cabinets 342 may provide support for table 302, and they may provide a convenient storage location that is not within the field of vision of cameras 306. In some embodiments cabinets 342 may include doors.

Another attribute of some embodiments may be access door 326. Access door 326 may be a portion of table 302 that includes hinges 344 at one end while the other end remains free. Thus, if a user wants to get into the open middle portion of table 302 (e.g., to adjust cameras 306, clean monitors 304, or pick something up that may have fallen off of table 302) he may be able to easily do so by lifting the free end of access door 326. This creates a clear path through table 302 and into the middle portion of table 302.

Another attribute of some embodiments may be the inclusion of power outlets or network access ports or outlets. These outlets or ports may be located on top of table 302, within dividers 336 or anywhere else that may be convenient or practical.

What may be missing from particular embodiments of telepresence system 300 is a large number of remotes or complicated control panels, as seen in typical high-end video conference systems. Rather, much of the functionality of telepresence system 300 may be controlled from a single phone, such as IP phone 318 (e.g., Cisco's 7970 series IP phone). By placing the controls for telepresence system 300 within an IP phone user 324b is presented with an interface with which he may already be familiar. This may minimize the amount of frustration and confusion involved in operating telepresence system 300.

Furthermore, in particular embodiments various components of telepresence system 300 may be used to conduct normal video conferences (e.g., where the remote site does not have a telepresence system available) or standard telephone calls. For example, user 324b may use IP phone 318 of telepresence system 300 to place a normal person-to-person phone call, or to conduct a typical audio conference call by activating microphones 310 and/or loudspeakers 308 (or the auxiliary loudspeaker, where applicable).

It will be recognized by those of ordinary skill in the art that the telepresence system depicted in FIG. 2, telepresence system 300, is merely one example embodiment of a telepresence system. The components depicted in FIG. 2 and described above may be replaced, modified or substituted to fit individual needs. For example, the size of the telepresence system may be reduced to fit in a smaller room, or it may use one, two, four or more sets of cameras, monitors, microphones, and loudspeakers. Furthermore, while FIG. 2 only depicts a single user within each user section, it is within the scope of particular embodiments for there to be multiple users sitting within any given user section and thus within the field of vision of a camera and displayed on the monitor. As another example, monitors 304 may be replaced by blank screens for use with projectors.

Figure 4:
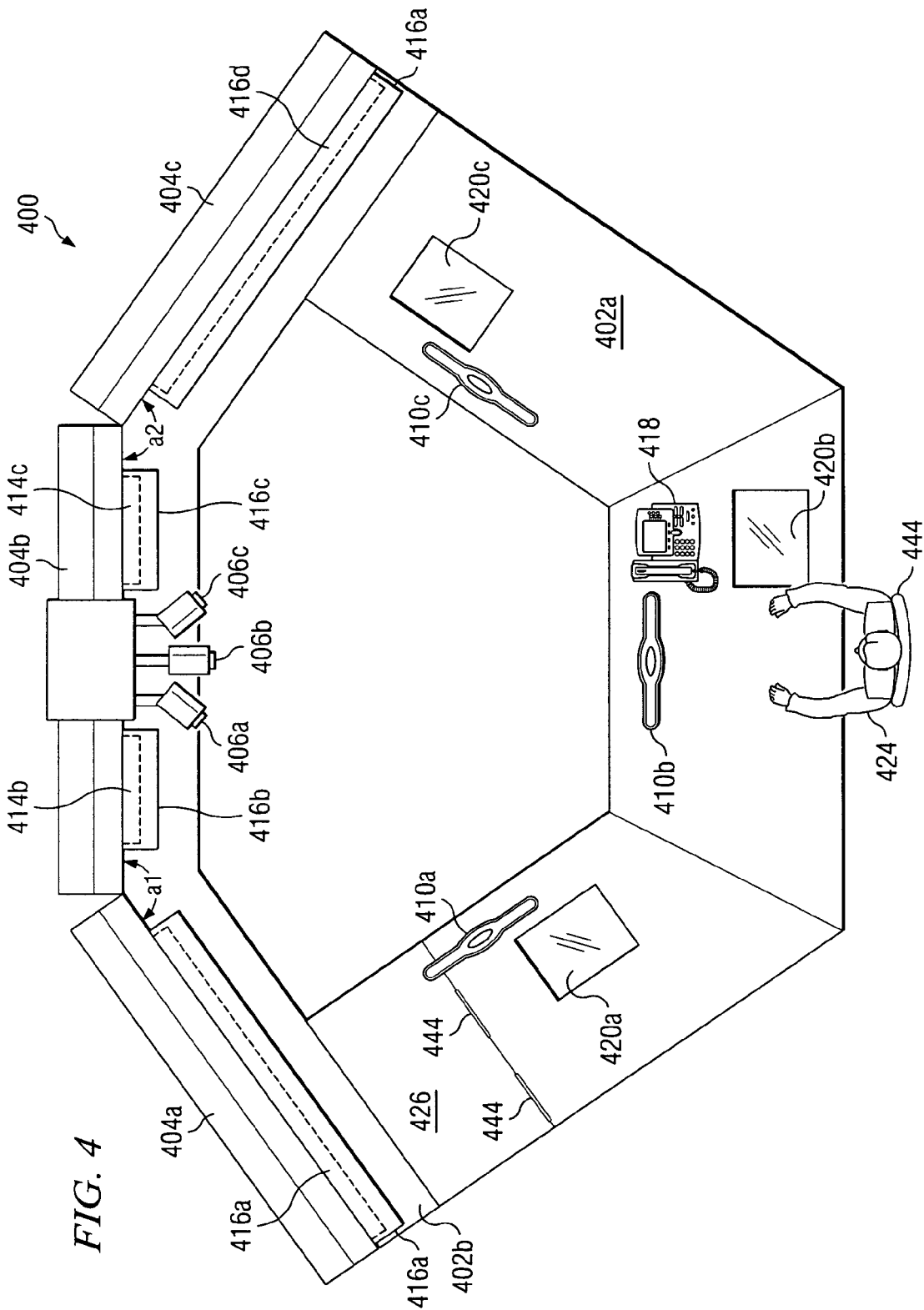
FIG. 4 illustrates an overhead view of the cameras, displays, and table of the exemplary telepresence system depicted in FIG. 3, in accordance with a particular embodiment of the present invention.

FIG. 3 illustrates a perspective view of a local exemplary telepresence system including portions of a remote telepresence system as viewed through local displays. FIG. 4 illustrates an overhead view of the cameras, displays, and table of the exemplary telepresence system depicted in FIG. 3.

Telepresence system 400 may be similar to telepresence system 300 of FIG. 2. More specifically, monitors 404, cameras 406, and table 402 may be similar to monitors 304, cameras 306 and table 302, respectively, of FIG. 2.

Cameras 406 may be positioned and aligned in concert with monitors 404 to optimize eye gaze. This increases the in-person feel of communicating with remote users 422 and makes determining where a remote user is looking simpler, easier, more natural and more accurate. Telepresence system 400 may include or control many of the variables that may go into optimizing the eye gaze of a remote user. For example, monitors 404 may be angled in towards the center of the table's front edge (where the users sit). In particular embodiments, monitors 404a and 404c may be angled towards the user section at which local user 424 is sitting such that angle a1 is approximately between 10 and 20 degrees (e.g., 15 degrees) and angle a2 is approximately between 10 and 20 degrees (e.g., 15 degrees).

As mentioned earlier, the quality of the eye gaze may be controlled by the location of cameras 406. Cameras 406 of telepresence system 400 may be positioned such that they are close enough to the center (vertical center and horizontal center) of monitors 404a of telepresence system 400 to be able to accurately capture the eye gaze of the local users without overly obscuring the images of, for example, remote users 422b and 422c as displayed on monitor 404b. In some embodiments, cameras 406 may be located at the horizontal mid-point of monitor 404b and at a distance d1 below the top edge of monitor 404b. Distance d1 may be large enough to allow cameras 406 to be low enough that when local user 424 is looking at remote users 422b and 422c, it may appear on remote monitor 404b that local user 424 is looking at remote users 422b and 422c. The actual length of distance d1 may depend on such factors as the size of monitors 404 and/or the distance between users 424 and cameras 406. Furthermore, in some embodiments cameras 406 may be located at the horizontal midpoint, thus preventing the eye gaze of remote users 422b and 422c from appearing distorted or out of alignment.

The congruity of the eye gaze of remote users 422b and 422c may be achieved, in part, by aligning a central axis of remote camera 406b such that it is perpendicular to the front edge of table 430 at a center point of the user section associated with remote camera 406b. Similarly, remote cameras 406a and 406c may be aligned so as to be perpendicular to the front edge of table 430 at the center point of their respective user sections. More specifically, the central axis of cameras 406a and 406c may be angled approximately between thirty and thirty-six degrees (e.g., thirty-three degrees) to the left and right respectively, of the central axis of camera 406b. Not only does this increase the effectiveness and accuracy of the eye gaze, it also allows multiple users within a camera's field of vision to be in focus and of approximately equal proportion (e.g., if two users are approximately the same size in person, then they may appear to be the same size on the monitor).

The congruity of the eye gaze of users within different user sections, displayed on different monitors, may also be achieved through the rotational alignment of the cameras. For example, remote cameras 406 may be rotationally aligned relative to one another so that any item that may span across multiple monitors may appear as a continuous image, without skewing. Thus, a straight line, for example the line created by the junction of the wall and ceiling, may be straight when displayed on monitors 404a and 404b, as opposed to having the line appear sloping up in monitor 404a and sloping down in monitor 404b.

As alluded to above, another aspect of telepresence system 400 that may contribute to the quality and accuracy of the eye gaze is the shape and location of table 402. The shape and location of local table 402 may be coordinated with the alignment and positioning of local cameras 406 and remote monitors 404 so that the image displayed on remote monitors 404 appears, to remote users 422, to be communicating directly to them, just as if local users were in the same room with and using the same table as the remote users. By designing the size, angle and position of local table 402 in conjunction with local cameras 406 telepresence system 400 may be able to increase the likelihood that local users of the system will appear fully proportional, in focus, and projecting accurate eye gaze to remote users via remote monitors 404. By having table 402 a predetermined distance from cameras 406 it may be possible to adjust the field of focus of cameras 406. Furthermore, by combining the known distance between table 402 and local camera 406 with the known size of remote monitor 404 it may be possible to adjust the zoom of local cameras 406 so that their image appears fully proportional in remote monitors 404 (recall that the zoom may depend on the distance between the remote camera and the remote user as well as the size of the local monitor).

Because the image of remote users 422 may be both fully proportional and in focus it may be relatively easy for local user 424 to determine quickly and accurately where any of remote users 422 are looking. The eye gaze created by telepresence system 400 may be similar to the eye gaze that may exist during an in-person meeting. More specifically, when a remote user, for example remote user 422a, looks at a remote target (e.g., something or someone located in the same site as the remote user) his eye gaze displayed on monitor 404a may be directed such that local users 424 may easily identify the remote target (or the direction of the remote target if the remote target is not within the field of vision of any of remote cameras 406) at which remote user 422 is looking. Similarly, when remote user 422a looks at the image of a local target (e.g., something or someone from the local site that is being displayed on one of remote monitors 404) his eye gaze displayed on monitor 404a may be directed such that local users 424 may easily identify the local target at which remote user 422a is looking. Furthermore, in some embodiments, the accuracy of the eye gaze may not be diminished by discontinuities in the image from monitor to monitor. This may be because the alignment of remote cameras 406 and local monitors 404 may be such that there is no overlap or any unaccounted gaps in the field of vision. More specifically, any gap between the fields of vision of, for example, remote cameras 406a and 406b may correspond to an equal size gap d2 between the screens of monitors 404a and 404b. Furthermore, because the central axes of remote cameras 406 may be perpendicular to the front edge of remote table 430 at each of the respective user sections and because the rotation of remote cameras 406 may be set, there may be little or no skewing of the image from one monitor to the next. Thus if remote user 422a was to reach across to touch remote user 422b, user 422a's arm would not appear abnormally long, short or disjointed.

In some embodiments table 402 may include dividers positioned to prevent users from moving out of the field of vision of the cameras, either in whole or in part (e.g., half of their body is displayed on one monitor while the other half of their body is displayed on the adjacent monitor). In particular embodiments the restriction may include a component coupled to table 402 which may make it uncomfortable to sit in front of or near the divider, or which may make it difficult to work on or near the divider. In some embodiments the restriction may include a floor feature that makes it difficult or uncomfortable to place or move a chair out of the field of vision of a camera. By preventing local users from sitting outside of a defined section it may reduce, and in some embodiments may eliminate, the need to have to adjust the alignment of the camera for each conference to maximize the eye gaze. It may also help ensure that local users do not inadvertently sit within a gap between the field of vision of two adjacent cameras or otherwise remove themselves, in whole or in part, from the field of vision a camera.

Figure 5:
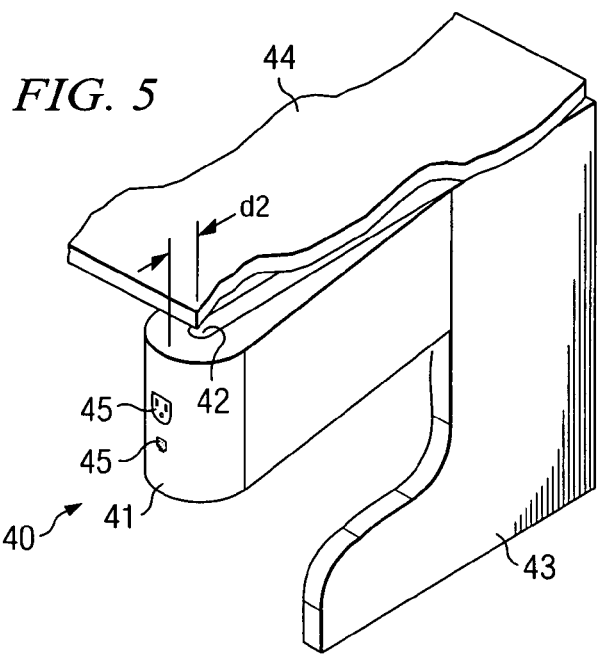
FIG. 5 illustrates a partition type divider, in accordance with a particular embodiment of the present invention.

FIG. 5 illustrates a partition type divider, in accordance with a particular embodiment of the present invention. Partition dividers 40 may be designed to prevent one or more users from moving outside the field of vision of their respective camera. This may be particularly desirable when there are multiple users within a single camera's field of vision because of the increased space needed by multiple users.

In some embodiments partition 40 may be integrated into support structure 43. Support structure 43 may support table top 44. Partitions 40 may be integrated into only a select number of support structures 43, or they may integrated into all support structures 43. The exact number of support structures that partitions 40 are integrated into may depend on the number and type of support structures that are used to support table top 44 as well as the number of cameras or user sections that are needed. For example, in FIG. 2, table 302 may be supported by cabinets 342 and dividers 336, and it may need to provide for three user sections. In this situation it may only be desirable to include two partitions, one each on dividers 336a and 336b, and to let cabinets 342 function as the dividers for the far left and far right sides of table 302. In another example, a table may be supported by several support structures (e.g., support structures that may not be overly intrusive or cumbersome with respect to leg room under the table) while still only needing three user sections. In such a situation it may be desirable to include partitions 40 on two of the support structures located between the three user sections (e.g., the points where the table changes its angle). Recall that in some embodiments a particular user section may coincide with the field of vision of a respective camera.

In particular embodiments partition 40 may comprise a rigid member 42 surrounded by a soft foam wrap 41. Depending on the embodiment, rigid member 42 may extend beyond the edge of table top 44, it may stop short of the edge of table top 44, or it may extend right up to the edge of table top 44. Regardless of the length of rigid member 42, it may be surrounded by soft foam wrap 41. Wrap 41 may provide both an aesthetic benefit as well as a safety/comfort benefit. Wrap 41 may increase the bulkiness of partition 40 which may increase its partitioning effectiveness.

In some embodiments, both rigid member 42 and wrap 41 may extend from the bottom surface of table top 44 all the way to the floor. Particular embodiments of partition 40 may include power outlet 45 and network outlet 46. Power outlet 45 and network outlet 46 may provide users with a convenient point to connect various electronic devices, such as a laptop. Some embodiments may include only one of power outlet 45 or network outlet 46 or neither. Similarly, some embodiments may include multiple power outlets 45 and/or network outlets 46.

Figure 6:
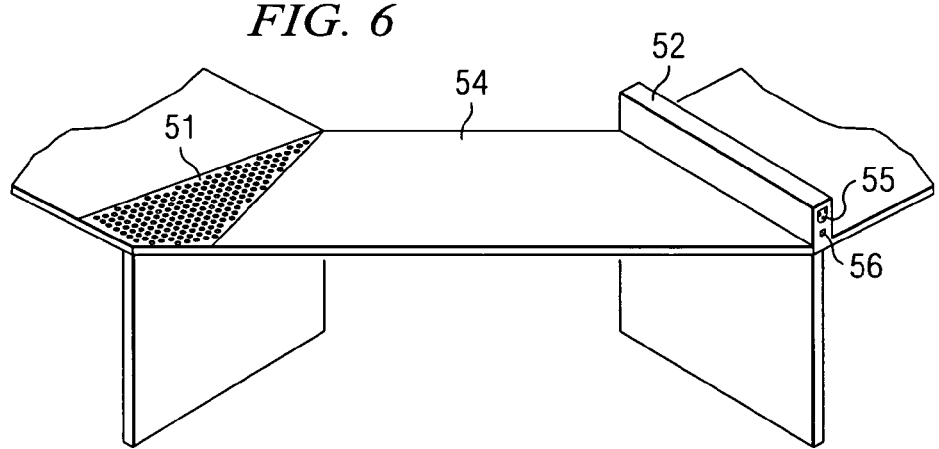
FIG. 6 illustrates a perforated area type divider and an uneven surface type divider, in accordance with a particular embodiment of the present invention.

FIG. 6 illustrates a perforated area type divider and an uneven surface type divider. These are two examples of two types of dividers that may be part of, or coupled to, the top surface of table top 54. It should be noted that while in FIG. 6 dividers 51 and 52 are different, in most embodiments they will typically, though not always, be similar.

Perforated area 51 may include several holes or perforations that may make writing in the area difficult. Because trying to write in perforated area 51 may be more difficult than writing on table top 54, users may be inclined to sit in front of table top 54 instead of perforated area 51. While perforated area 51 is depicted as having a plurality of round holes, other embodiments may include square holes, long slits, a mesh like surface, or any other perforation that may make writing in perforated area 51 difficult or undesirable.

Uneven surface area 52 may comprise a raised protrusion, extension, outcropping, ridge, bump or projection that may make it difficult to place items, such as laptops or pads of paper, on uneven surface area 52. This may prevent users from sitting in front of uneven surface area 52 by discouraging them from using the area as a work space. In particular embodiments, power outlet 55 and/or network outlet 56 may be incorporated into uneven surface area 52. While uneven surface 52 is depicted as being a single rectangular protrusion extending from the front edge of table top 54 to the back edge, other embodiments may include alternate uneven surfaces. For example, uneven surface 52 may include any of the following: a single rectangular protrusion that extends only part of the way back towards the back edge of table 54, multiple rectangular protrusions, rounded protrusions, angled protrusions, rectangular channels, rounded channels, angled channels, circular bumps, or any other protrusion, bump, ridge, channel, groove, or crease that may prevent a user from sitting near uneven surface 52.

Both perforated area 51 and uneven surface area 52 may comprise components or features made of the same material as table top 54 or they may be made of a different material, such as a contrasting material. The use of a different contrasting type of material may further indicate the boundaries of a particular user section. In particular embodiments, local dividers 51 and 52 may not be seen by remote users because the local dividers may be positioned within the horizontal gap between the vertical edges in the field of vision of the local cameras.

As mentioned above, perforated area 51 and uneven surface 52 are merely two examples of two different types of dividers that can be integrated into the top surface of table top 54. Particular embodiments contemplate numerous other types of dividers integrated into table top 54, such as using a non-rigid area or a gap. Furthermore, each type of divider may include numerous variations, for example, a non-rigid area may include a soft foam or a rubber material, the material may extend the full width of table top 54 or it may cover some portion of the width of table top 54. Additionally, it should be noted that while it was mentioned above that it may not be desirable to have a table in which the dividers do not match (e.g., one divider is a perforated surface and another divider is a gap), it may be desirable to combine multiple types of dividers together into a single divider. For example, the raised protrusion of uneven area 52 may be flanked on either side by a non-rigid area.

Figure 7:
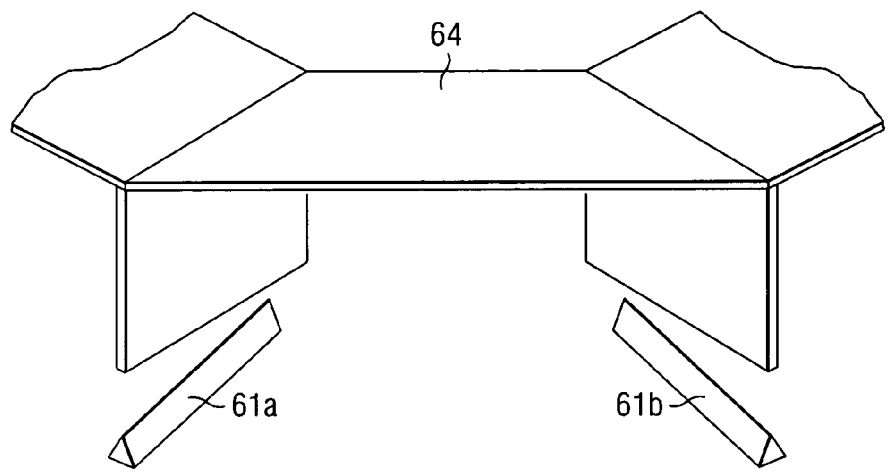
FIG. 7 illustrates a ridge type divider located on the floor, in accordance with a particular embodiment of the present invention.
Figure 8:
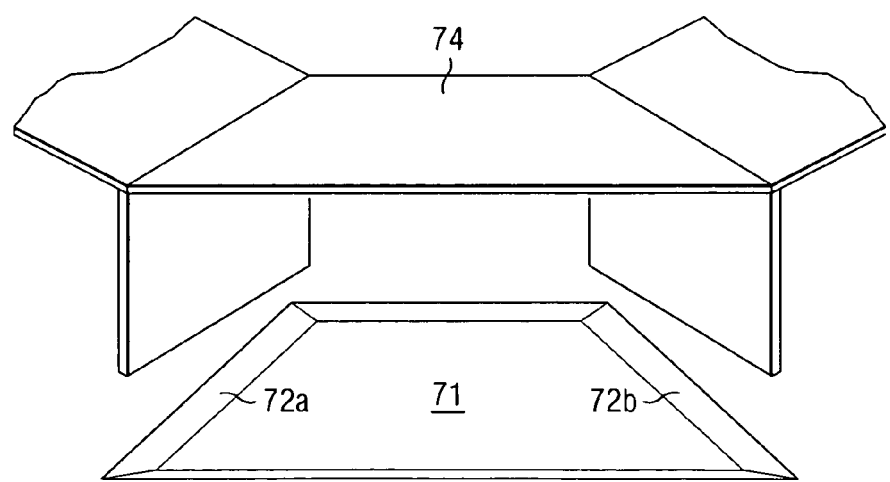
FIG. 8 illustrates an indentation type divider located on the floor, in accordance with a particular embodiment of the present invention.

FIG. 7 illustrates a ridge type divider located on the floor and FIG. 8 illustrates an indentation type divider located on the floor. FIGS. 7 and 8 are examples of dividers that may be integrated into the floor. The purpose of the floor dividers, similar to the purpose of the dividers in FIGS. 5 and 6, may be to help keep the users within the field of vision of the cameras by preventing users from moving laterally along the table and out of the respective camera's field of vision. More specifically, the floor dividers may prevent lateral movement along the table by making it difficult for the user to mover their chair past the floor divider.

In some embodiments, ridges 61 may be aligned with the horizontal gap between the fields of vision of two adjacent cameras. The shape of ridges 61 may vary depending on the embodiment. For example, ridges 61 may be rounded, angled, or flat. Similarly the height and width of ridges 61 may also vary. In particular embodiments, ridges 61 may extend under table top 64, in some embodiments ridges 61 may stop at or prior to the front edge of table top 64. Because ridge 61 protrudes above the plane of the floor a user may find it difficult to move their chair over ridge 61. When this is combined with a typical uses natural inclination to stay within defined boundaries, ridge 61 may function to prevent users from leaving the field of vision associated with their respective user section.

Indentation 71 may be located approximately within the center of each user section and/or the field of vision of each camera. Depending on the embodiment, sides 72 of indentation 71 may be angled, rounded or vertical. The depth and shape of indentation 71 may similarly vary between embodiments. For example, sides 72 may extend away from table top 74 at an angle that may approximate the edge of the field of vision of the respective camera, or they may be straight (perpendicular to the front edge of table top 74 and parallel to each other) or anywhere in between. The indentation may extend under table top 74 or it may stop at or prior to the front edge of table top 74. Because a user's chair may reside within indentation 71 with its sides 72 that extend up from the bottom surface of indentation 71 a user may find it difficult to move their chair out of indentation 71. When this is combined with a typical user's natural inclination to stay within defined boundaries, indentation 71 may function to prevent users from leaving the field of vision associated with their respective user section.

Because ridges 61 and indentation 71 create an uneven floor, in some embodiments ridges 61 and sides 72 of indentation 71 may be uniquely colored or patterned. This may help draw the users attention to the dividers as they are walking about the room and thus may help to prevent tripping.

Ridges 61 and indentation 71 are merely two types of dividers that may be used with a telepresence system to help prevent users from leaving the camera's field of vision. The present invention contemplates numerous other types of dividers integrated into the floor. For example, a telepresence system may include a thick carpet floor, with a rigid surface area designed to encourage a user to remain on the rigid surface and thus within the camera's field of vision.

Figure 9:
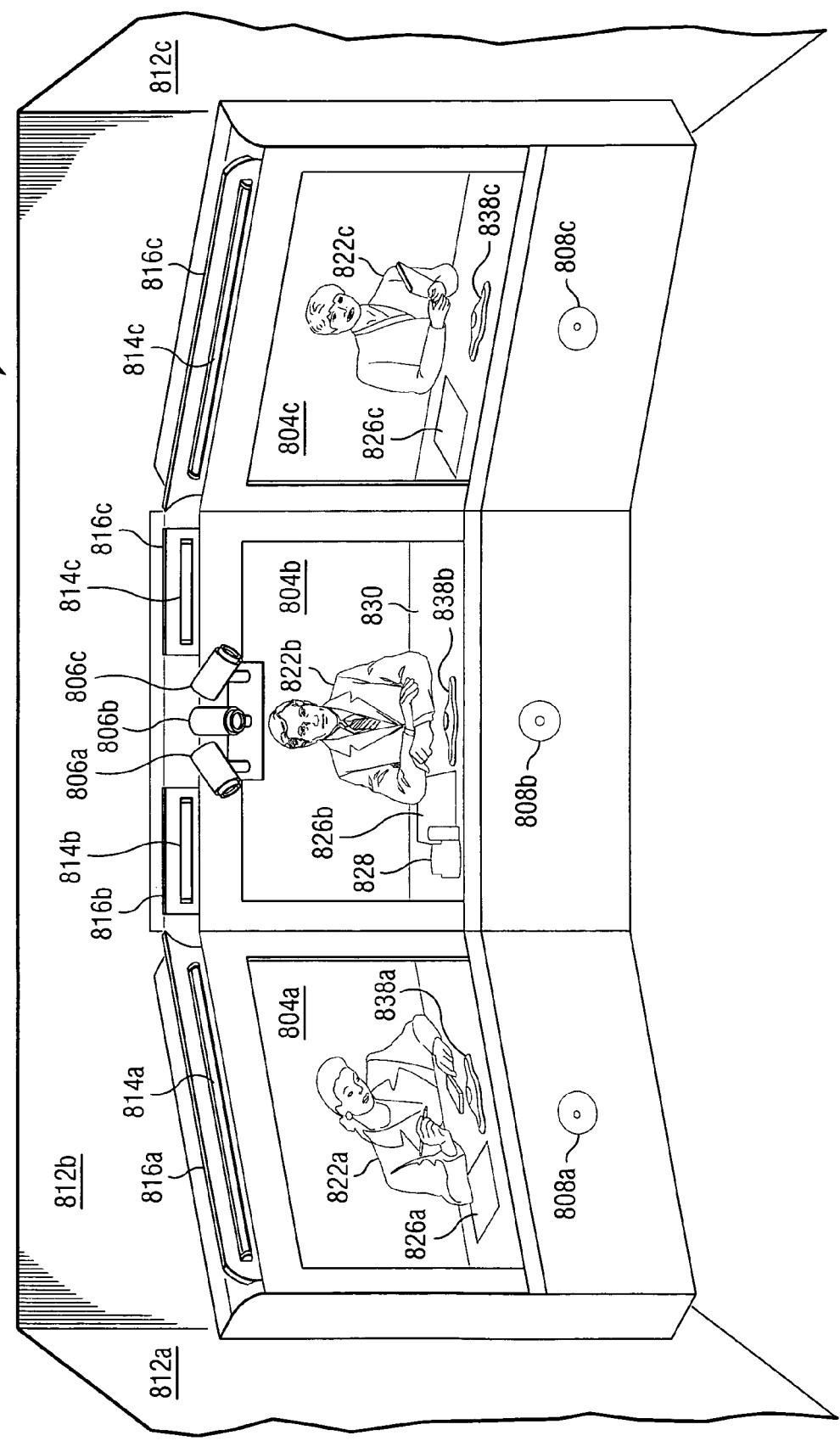
FIG. 9 illustrates an arrangement of local loudspeakers and displays, in accordance with a particular embodiment of the present invention.

FIG. 9 illustrates an arrangement of local loudspeakers and displays. Loudspeaker 808*a* may be associated with monitor 804*a* and microphone 838*a*; loudspeaker 808*b* may be associated with monitor 804*b* and microphone 838*b*; and loudspeaker 808*c* may be associated with monitor 804*c* and microphone 838*c*. As mentioned above, microphones 838 may be directional microphones that may be interconnected so that sound may be detected and transmitted by the microphone at which the sound is loudest. This may allow a remotely created sound to be reproduced by a single loudspeaker 808. While loudspeakers 808 are depicted as being below monitors 804, in particular embodiments they may be located above or behind monitors 804. In particular embodiments the loudspeakers may be located on the sides of monitors 804. In an embodiment in which the loudspeakers are on the sides of monitors 804 it may be that there is one loudspeaker between adjacent monitors that is shared by the two adjacent monitors. If, for example, remote microphone 838a detects a sound, the sound may be reproduced via a first loudspeaker to the left of monitor 804a and a second loudspeaker between monitor 804a and 804b; if, for example, remote microphone 838b detects a sound, the sound may be reproduced via the second loudspeaker and a third loudspeaker between monitor 804b and 804c; and if, for example, remote microphone 838c detects a sound, the sound may be reproduced via the third loudspeaker between monitor 804b and 804c and a fourth loudspeaker to the right of monitor 804c.

In some embodiments microphones 838 may be attached to table 830. For example, microphones 838 may be positioned and attached so that they are equidistant from either side of their respective section of table 830 and between 30 and 50 centimeters back from the front edge of table 830. Thus, if two users were to be within the same user section associated with microphone 838a, microphone 838a may be able to equivalently detect sound from both users. The positioning of a microphone between two users allows for each user to have an individual work area where the shared microphone does not interfere with their work area. For example, the users can each have a laptop computer on either side of the microphone. In those embodiments in which microphones 838 are not attached to table 830, the movement of microphones 838 may be limited by the length of a cable attached thereto. This may help to prevent microphones 838 from being moved out of their respective user section and it may help to avoid mixing up the microphones.

Regardless of whether microphones 838 are attached to table 830, they may include additional features, such as in some embodiments microphones 838 may include a mute button. Particular embodiments may further include an LED that illuminates to indicate that the microphone has been muted. In particular embodiments, microphone 838 may include a wire mesh screen that may help to prevent air turbulence. Some embodiments may further include a layer of open-cell foam underneath the wire mesh screen to prevent air from blowing into the microphone. Furthermore, in some embodiments microphones 838 may be low profile microphones. This may help reduce the impact of sound that may reflect off of the table.

By taking advantage of the fixed, or relatively fixed, location of microphones 838 and some of the other various features described above (e.g., the dividers preventing lateral movement, the alignment of the cameras) the telepresence system is able to create location specific sound. This can best be seen by looking at the various associations/interactions of a single set of telepresence components. Because microphone 838a may be at a fixed location, or within a relatively limited area, and that location may be within view of a specific camera that supplies the image for monitor 804a it may be possible for loudspeaker 808a to reproduce sound originating from the area around microphone 838a (e.g., the area within the field of vision of the camera providing the image displayed on monitor 804a). More specifically, if user 822a speaks his voice may be detected by microphone 838a and, to a lesser extent, by microphone 838b. The telepresence system may filter out or otherwise remove the softer sound of user 822a's voice from microphone 838b. Then user 822's voice may be reproduced locally by loudspeaker 808a as his image, as displayed on monitor 804a, moves (e.g., as his mouth moves to form the words or his hands move to point to specific things). By reproducing user 822's voice through loudspeaker 808a local users may be able to quickly identify where the loudspeaker is (the human ear is able to accurately locate the source of sound in a side-to-side direction) and thus which user is speaking.

Not only may microphones 838 be able to filter sounds detected by other microphones 838, but in particular embodiments they may also be able to filter or remove other types of sounds. For example, where microphone 838b detects a loud tapping noise but no other microphone detects the tapping, it may be assumed that the tapping is coming from local user 822b tapping his finger on, or near, microphone 838b. This undesirable noise may be filtered or removed. Another sound that some embodiments may be able to remove is the sound of something, for example paper, being dragged over the microphone.

The present invention contemplates great flexibility in the arrangement and design of elements within a telepresence system as well as their internal components. Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A system for preventing movement in a telepresence system, comprising:
   a plurality of cameras, each camera having a respective field of vision for viewing one or more users within at least one of a plurality of user sections, the fields of vision each having lateral boundaries aligned along two sides of a respective user section such that each user within one of the plurality of user sections is within the respective field of vision of only one of the plurality of cameras; and
   a plurality of restrictive elements each positioned along a respective lateral boundary of a field of vision of the fields of vision of the plurality of cameras such that viewed users each positioned within a field of vision of the plurality of cameras are restricted by the plurality of restrictive elements from moving outside of the field of vision in which each viewed user is positioned.

2. The system of claim 1, wherein the plurality of restrictive elements are positioned such that the viewed users are restricted by the plurality of restrictive elements from moving inside a different field of vision from the field of vision in which each viewed user is positioned.

3. The system of claim 1:
   further comprising a table at which the viewed users sit; and
   wherein the plurality of restrictive elements comprise a plurality of restrictive elements coupled to the table.

4. The system of claim 1, wherein the plurality of restrictive elements are coupled to an underneath portion of the table.

5. The system of claim 3, wherein the plurality of restrictive elements are covered in a soft foam material.

6. The system of claim 3, wherein at least one restrictive element of the plurality of restrictive elements includes a power outlet.

7. The system of claim 3, wherein at least one restrictive element of the plurality of restrictive elements includes a network outlet.

8. The system of claim 1, wherein the plurality of restrictive elements comprise a plurality of table elements each incorporated into a table and positioned along a respective lateral boundary of a field of vision of the fields of vision of the plurality of cameras and configured to inhibit use by the viewed users of the portion of the table into which the table element is incorporated.

9. The system of claim 8, wherein the plurality of table elements comprise a plurality of gaps.

10. The system of claim 8, wherein the plurality of table elements comprise a plurality of uneven or non-rigid surface areas.

11. The system of claim 8, wherein the plurality of table elements comprise a plurality of perforated surface areas.

12. The system of claim 1, wherein the plurality of restrictive elements comprise a plurality of floor elements integrated into the floor, each floor element positioned and configured such that the viewed users are each inhibited from moving in a chair outside of the field of vision in which each viewed user is positioned.

13. The system of claim 12, wherein the plurality of floor elements comprise a plurality of ridges.

14. The system of claim 12, wherein the plurality of floor element comprise a plurality of indentations.

15. A method for preventing movement in a telepresence system, comprising:
   positioning a plurality of cameras, each camera having a respective field of vision for viewing one or more users within at least one of a plurality of user sections, the fields of vision each having lateral boundaries aligned along two sides of a respective user section such that each user within one of the plurality of user sections is within the respective field of vision of only one of the plurality of cameras; and
   positioning a plurality of restrictive elements each along a respective lateral boundary of a field of vision of the fields of vision of the plurality of cameras such that viewed users each positioned within a field of vision of the plurality of cameras are restricted by the plurality of restrictive elements from moving outside of the field of vision in which each viewed user is positioned.

16. The method of claim 15, wherein positioning a plurality of restrictive elements comprises positioning the plurality of restrictive elements such that the viewed users are restricted by the plurality of restrictive elements from moving inside a different field of vision from the field of vision in which each viewed user is positioned.

17. The method of claim 15, wherein the plurality of restrictive elements comprise a plurality of restrictive elements coupled to a table at which the viewed users sit.

18. The method of claim 15, wherein the plurality of restrictive elements are coupled to an underneath portion of the table.

19. The method of claim 18, wherein the plurality of restrictive elements are covered in a soft foam material.

20. The method of claim 18, wherein at least one restrictive element of the plurality of restrictive elements includes a power outlet.

21. The method of claim 18, wherein at least one restrictive element of the plurality of restrictive elements includes a network outlet.

22. The method of claim 15, wherein positioning a plurality of restrictive elements comprises positioning each of a plurality of table elements into a table and along a respective lateral boundary of a field of vision of the fields of vision of the plurality of cameras, wherein the plurality of table elements are configured to inhibit use by the viewed users of the portion of the table into which the table element is incorporated.

23. The method of claim 22, wherein the plurality of table elements comprise a plurality of gaps.

24. The method of claim 22, wherein the plurality of table elements comprise a plurality of uneven or non-rigid surface areas.

25. The method of claim 22, wherein the plurality of table elements comprise a plurality of perforated surface areas.

26. The method of claim 15, wherein positioning a plurality of restrictive elements comprises positioning and configuring each of a plurality of floor elements integrated into the floor such that the viewed users are each inhibited from moving in a chair outside of the field of vision in which each viewed user is positioned.

27. The method of claim 26, wherein the plurality of floor elements comprise a plurality of ridges.

28. The method of claim 26, wherein the plurality of floor elements comprise a plurality of indentations.

29. The system of claim 1, further comprising at least one seating element within each respective field of vision, wherein each of the plurality of restrictive elements are positioned between two seating elements of adjacent fields of vision.

30. A system for preventing movement in a telepresence system, comprising:
   a plurality of cameras, each camera having a respective field of vision for viewing one or more users within at least one of a plurality of user sections, the fields of vision each having lateral boundaries aligned along two sides of a respective user section such that each user within one of the plurality of user sections is within the respective field of vision of only one of the plurality of cameras; and
   a plurality of restrictive elements each positioned such that viewed users, each positioned within a field of vision of the plurality of cameras, are able to move laterally within the field of vision in which each viewed user is positioned and such that viewed users are restricted by the plurality of restrictive elements from moving outside of the field of vision in which each viewed user is positioned.

* * * * *